(12) United States Patent
Schreiber et al.

(10) Patent No.: US 8,764,976 B2
(45) Date of Patent: Jul. 1, 2014

(54) BIOLOGICAL WASTEWATER SYSTEM HAVING A SCREEN STRUCTURE FOR CONFINING BIOFILM CARRIERS TO A REACTOR FORMING A PART OF THE SYSTEM

(75) Inventors: Justin Schreiber, Raleigh, NC (US); Charles H. Guthrie, Raleigh, NC (US)

(73) Assignee: Veolia Water Solutions & Technologies Support, Saint Maurice (FR)

( * ) Notice: Subject to any disclaimer, the term of this patent is extended or adjusted under 35 U.S.C. 154(b) by 341 days.

(21) Appl. No.: 13/209,107

(22) Filed: Aug. 12, 2011

(65) Prior Publication Data
US 2013/0037466 A1 Feb. 14, 2013

(51) Int. Cl.
*C02F 3/08* (2006.01)

(52) U.S. Cl.
CPC .............. *C02F 3/08* (2013.01); *C02F 2203/006* (2013.01)
USPC ............ 210/151; 210/232; 210/291; 210/616

(58) Field of Classification Search
USPC ......... 210/150, 151, 232, 283, 289, 291, 499, 210/615, 616, 617
See application file for complete search history.

(56) References Cited

U.S. PATENT DOCUMENTS

| | | | | |
|---|---|---|---|---|
| 1,311,639 A | * | 7/1919 | Cartwright | 210/499 |
| 2,071,591 A | * | 2/1937 | Tholin | 210/616 |
| 3,764,525 A | * | 10/1973 | Goodman et al. | 210/615 |
| 4,663,046 A | * | 5/1987 | Feldkirchner et al. | 210/616 |
| 4,705,634 A | * | 11/1987 | Reimann et al. | 210/151 |
| 5,198,105 A | * | 3/1993 | Kauling et al. | 210/151 |
| 5,609,753 A | | 3/1997 | Prazmowski | |
| 5,741,417 A | * | 4/1998 | Patzig et al. | 210/605 |
| 6,015,490 A | * | 1/2000 | Katsukura et al. | 210/151 |
| 6,231,766 B1 | | 5/2001 | Hausin | |
| 6,569,337 B2 | * | 5/2003 | Sato et al. | 210/150 |
| 2011/0240535 A1 | | 10/2011 | Pehrson et al. | |

FOREIGN PATENT DOCUMENTS

WO 2010096450 A1 8/2010

* cited by examiner

*Primary Examiner* — Christopher Upton
(74) *Attorney, Agent, or Firm* — Coats and Bennett PLLC

(57) ABSTRACT

A biological wastewater treatment system includes a tank or reactor for holding and treating wastewater. Disposed in the tank or reservoir is an array of biofilm carriers for supporting biomass that remove pollutants and contaminates from the wastewater. A screen structure is mounted to the tank for screening treated wastewater flowing from the tank and preventing the biofilm carriers from being discharged from the tank. The screen structure includes a vertical screen made up of a plurality of screen modules disposed in side-by-side relationship and disposed upstream of an outlet formed in the tank. Further this screen structure may include a plurality of auxiliary screens that project form the vertical screen inwardly towards the interior area of the tank thereby providing increased screening area through which wastewater is discharged during a wastewater treatment process. The auxiliary screens include a screen area that extends around an open area and wherein wastewater passes through the screen area of the auxiliary screens into the interior area and from the interior area the wastewater passes through the plane of the vertical screen.

28 Claims, 13 Drawing Sheets

BIOLOGICAL WASTEWATER SYSTEM HAVING A SCREEN STRUCTURE FOR CONFINING BIOFILM CARRIERS TO A REACTOR FORMING A PART OF THE SYSTEM

FIELD OF THE INVENTION

The present invention relates to biological wastewater treatment systems, and more particularly to biological wastewater systems that utilize biofilm carriers.

BACKGROUND

Biological wastewater treatment systems that utilize biofilm carriers or biocarriers are known. These biofilm carriers move about in a tank or reactor. During the course of a wastewater treatment process, these biofilm carriers are effective for removing contaminants or pollutants from the wastewater. Since treated wastewater must be discharged from a tank or reactor, some provision must be provided for discharging the treated wastewater and at the same time retaining the biofilm carriers.

Screen structures are used to prevent biofilm carriers from being discharged with wastewater leaving the tank or reactor. However conventional screen structures used in tanks and reactors to retain biofilm carriers include frames that consume a significant area. In some cases these frames extend into the treatment tank and impede the movement of biofilm carriers, sometimes leading to blockage of the screens.

Typical screen supports or frames are not integral with the screens. This resulted in the frames, without the screens, being mounted to the concrete wall of the tank. Securing the screen panels to the frames previously mounted to the wall is a difficult and time consuming task. Typically supports project from the wall of the tank and support both the frame structure and the screen panels that have been attached to the frame structure. Once the frame structure and screens have been mounted adjacent a wall, these supports are typically located behind the screen panels which makes inspection very difficult. Furthermore the screen support beams and columns that make up the frame structure are usually very stiff structurally and do not conform well to irregularities in a concrete wall, leading to misalignment between adjacent screen panels and sometimes requiring field modifications to the screen panels in order to mount them to the previously mounted frame.

In the end the final screen assembly is made up of many separate parts, screens, support components and hardware. Spaces or gaps that surround the screens are typically filled with imperviable strips that decrease the effective screening area.

Therefore, there has been and continues to be a need for a screen structure for use in a biological wastewater treatment system that uses biofilm carriers where the screen structure is simple and easy to install and which readily conforms to irregularities in the wall structure to which the screen modules are to be mounted.

SUMMARY

The present invention relates to a screen structure for use in confining biofilm carriers in a wastewater treatment system where the screen structure is made up of an array of screen modules that are similar and which can be easily mounted to a wall.

The present invention also entails a screen structure that includes a relatively smooth outer surface which does not protrude inwardly into the tank or reactor and impede the movement of biofilm carriers.

In addition the present invention entails an array of screen modules where each module comprises an integral frame and a screen panel secured to the frame. Each screen module includes a plurality of anchor compartments that enables installers to easily mount the screen module to a wall. In particular, once the screen module is placed adjacent the wall, the installer can utilize the anchor compartment to precisely drill a hole in the wall for receiving an anchor and thereafter the anchor can be inserted through the anchor compartment into the drilled hole and secured therein. Thus the screen module is supported by a series of anchors that project outwardly from the wall through the respective anchor compartments that extend around the perimeter of the frame of each screen module.

Other objects and advantages of the present invention will become apparent and obvious from a study of the following description and the accompanying drawings which are merely illustrative of such invention.

BRIEF DESCRIPTION OF THE DRAWINGS

FIG. 1 is a fragmentary perspective view of a tank or reactor that forms a part of a wastewater treatment system and wherein FIG. 1 shows the screen structure of the present invention mounted adjacent a wall of the tank or reactor.

FIG. 11A is an enlarged view of a series of biofilm carriers taken from FIG. 11.

DESCRIPTION OF EXEMPLARY EMBODIMENTS

The present invention relates to a biological wastewater treatment system of the type that utilizes biofilm carriers such as commonly found in MBBR wastewater treatment systems. For example, AnoxKaldnes, headquartered in Sweden, promotes MBBR biofilm technology which utilizes plastic biofilm carriers or biocarriers that are suspended in the wastewater being treated and generally move within a tank or reactor that is holding the wastewater. Biofilm grows protected within these engineered plastic carriers that degrade pollutants and contaminants contained within the wastewater. After the wastewater has been treated in the tank or reactor having the biofilm carriers therein, the wastewater is drained or removed from the tank or reactor. Some means must be placed in the reactor to retain the biofilm carriers so that they are not discharged from the tank or reactor as treated wastewater is discharged. Therefore the present invention deals with a screening assembly mounted in a tank or in a reactor to screen the wastewater being discharged, and in the process retains the biofilm carriers within the tank or reactor, preventing the biofilm carriers from being inadvertently discharged.

For a complete and more unified understanding of biofilm carriers and their function in wastewater treatment processes, reference is made to the following United States patents which are expressly incorporated herein by reference: U.S. Pat. Nos. 5,458,779; 5,543,039; and 6,126,829.

With particular reference to the drawings, a biological wastewater treatment system is shown therein. The biological wastewater treatment system comprises a tank or reactor indicated generally by the numeral 10. See FIG. 11. Tank 10 is designed to receive wastewater to be treated. In addition the biological wastewater treatment system of the present invention is designed to utilize biofilm carriers referred to generally by the numeral 12. See FIG. 11. As discussed above, the biofilm carriers 12 support biomass or biofilm that is effective in carrying out biological wastewater treatment. It should be noted that the tank or reactor 10 could be a single tank in a treatment system that comprises a plurality of tanks or reactors with various tanks performing particular treatment processes. For example, the tank or reactor 10 discussed herein can form a part of many different types of biological treatment systems such as systems designed for nitrification, denitrification, BOD removal, etc.

Figure 12:
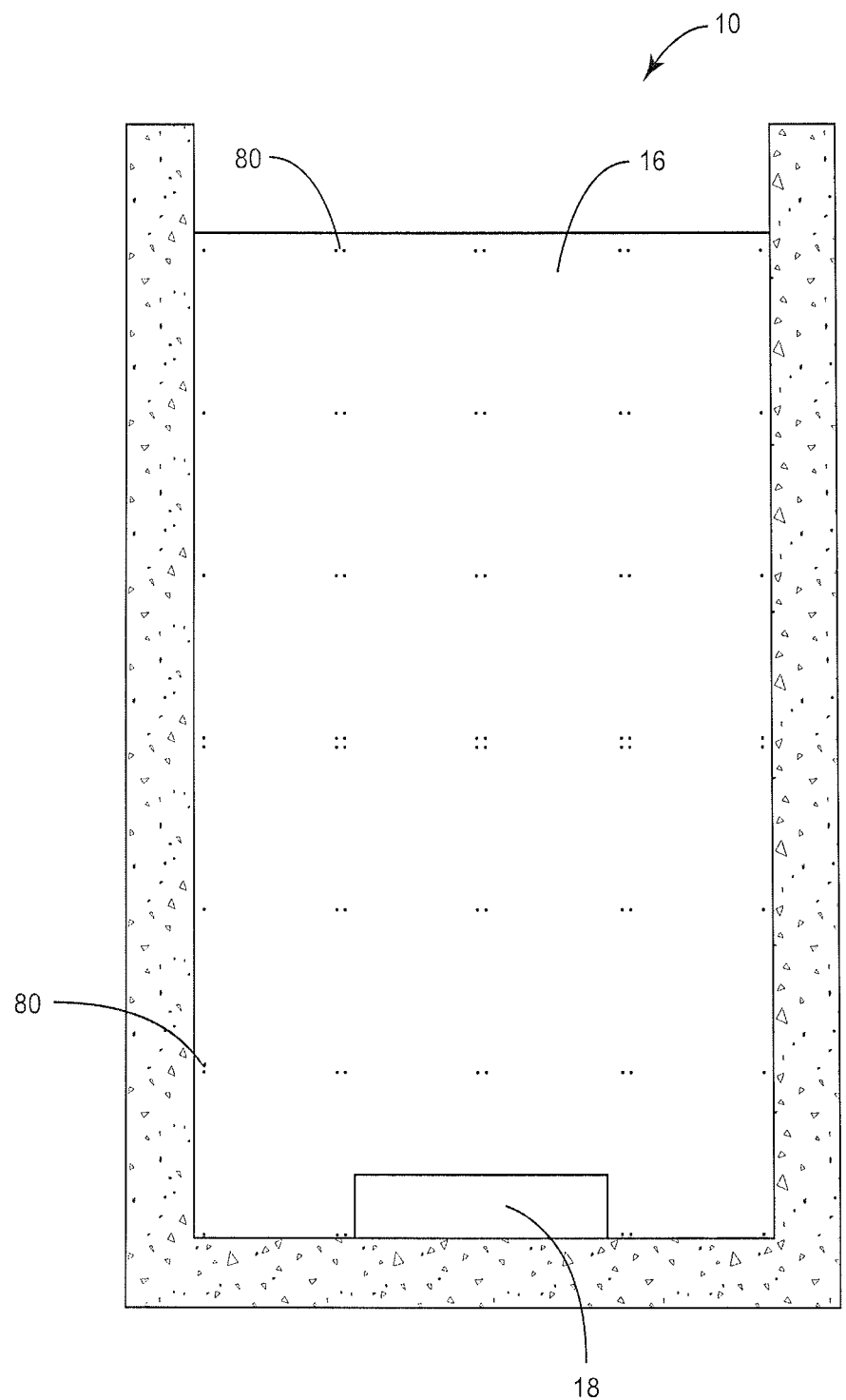
FIG. 12 is an elevation view of a wall of the tank or reactor before the screen modules are mounted thereto and which shows an exemplary pattern for the anchors that support an array of screen modules.

Continuing to refer to the tank or reactor 10, the same includes a bottom 14 and a surrounding wall structure 16. As seen in FIG. 12, one wall 16 includes a drain or outlet 18 (shown at the bottom but may be oriented differently) that permits treated water to be discharged from the tank 10. Although not shown, the tank 10 may be provided with an aeration system for dispersing air into the tank 10 during a wastewater treatment process.

Figure 11:
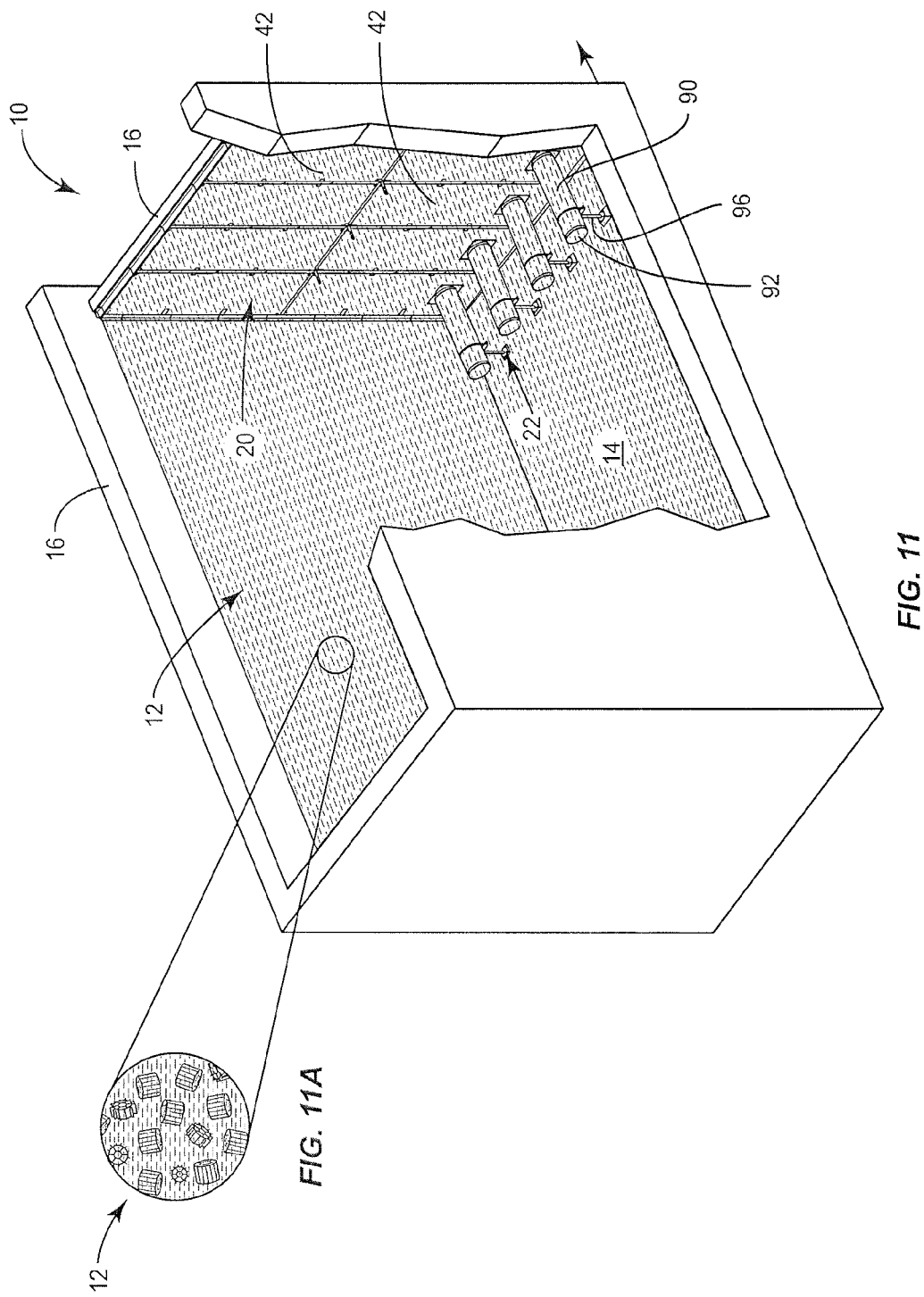
FIG. 11 is a perspective view of a tank or reactor with a portion of a side wall being cut out to better illustrate the screen structure of the present invention.

Tank or reactor 10 includes a screen structure mounted to one of the walls 16 for retaining the biofilm carriers 12. In the case of the embodiment illustrated herein, the screen structure is mounted adjacent the right hand wall of the tank 10 as shown in FIG. 11. This wall includes the outlet or drain 18 as shown in FIG. 12. Thus treated wastewater passing through the screen structure will move downwardly to outlet 18 where the treated water is discharged from the tank 10.

Figure 1:
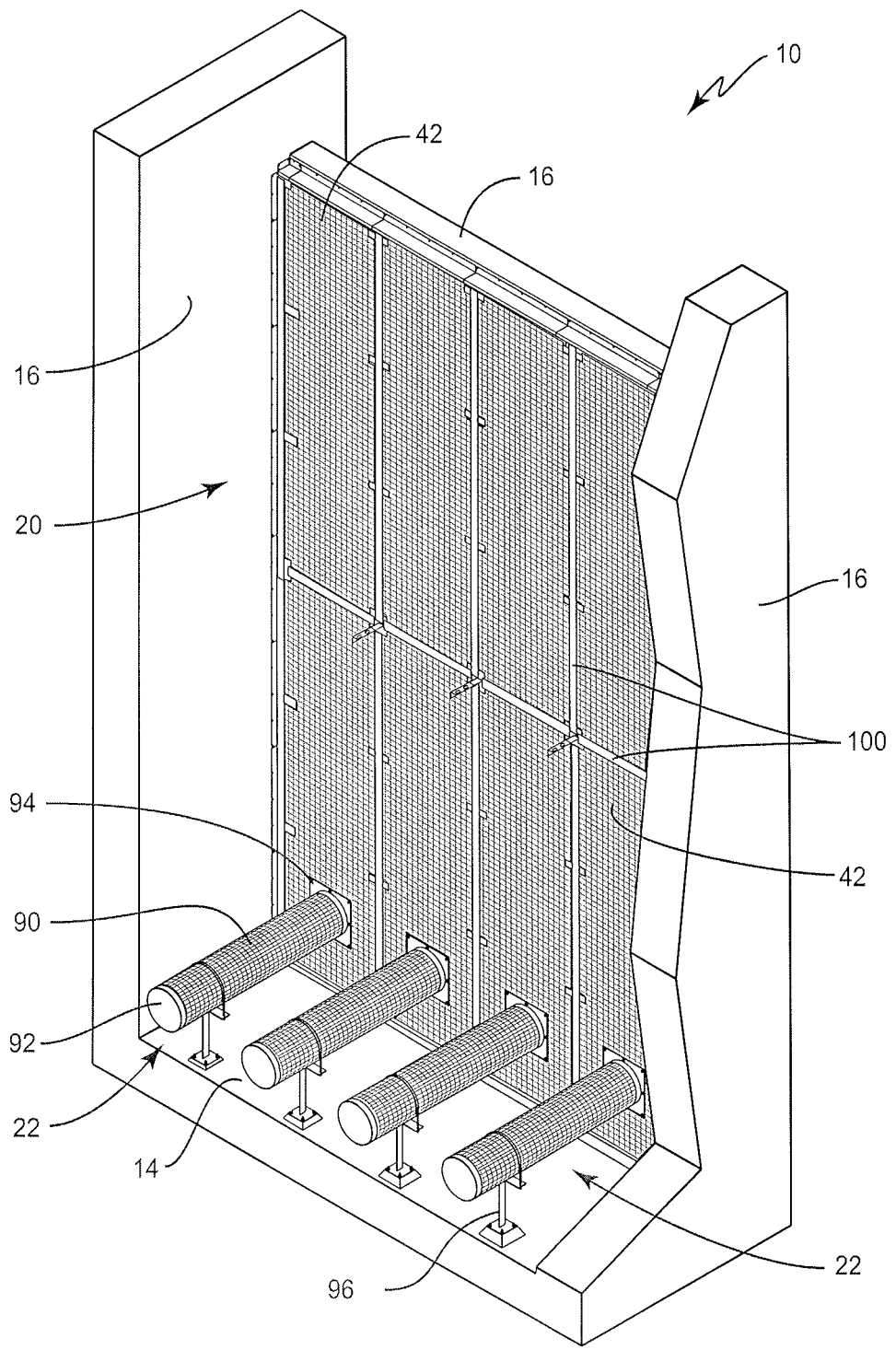

The screen structure shown in the drawings comprises a vertical screen indicated generally by the numeral 20 and one or more auxiliary screens indicated generally by the numeral 22. First with respect to the vertical screen 20, as shown in FIG. 1, it is seen that the vertical screen is disposed closely adjacent wall 16. Vertical screen 20 extends from the top to the bottom of wall 16 as well as from side-to-side along the same wall. In the end, substantially the entire wall is covered by the vertical screen 20. As will be discussed subsequently herein, vertical screen 20 is made up of an array of screen modules 30 and 32 as shown in FIGS. 2, 3, 5 and 6.

Auxiliary screens 22 increase the screening area of the screen structure. Note in FIG. 1 where there is provided four auxiliary screens 22. The number of auxiliary screens 22 and their position with respect to the vertical screen 20 can vary. In the embodiment illustrated herein, each auxiliary screen 22 projects horizontally from the vertical screen 20. In this case, each auxiliary screen 22 assumes a generally cylindrical shape. It is appreciated that the shape and size of the auxiliary screens 22 can vary. Each auxiliary screen 22 is communicatively connected with the vertical screen 20. As will be appreciated from subsequent portions of the disclosure, treated water will pass through the auxiliary screen 22 into an interior area therein and from there the water will pass through the plane of the vertical screen 20. After passing through the plane of the vertical screen 20, the water will be directed to the outlet 18 behind the vertical screen 20. Further information concerning the auxiliary screens 22 will be discussed subsequently herein.

Figure 2:
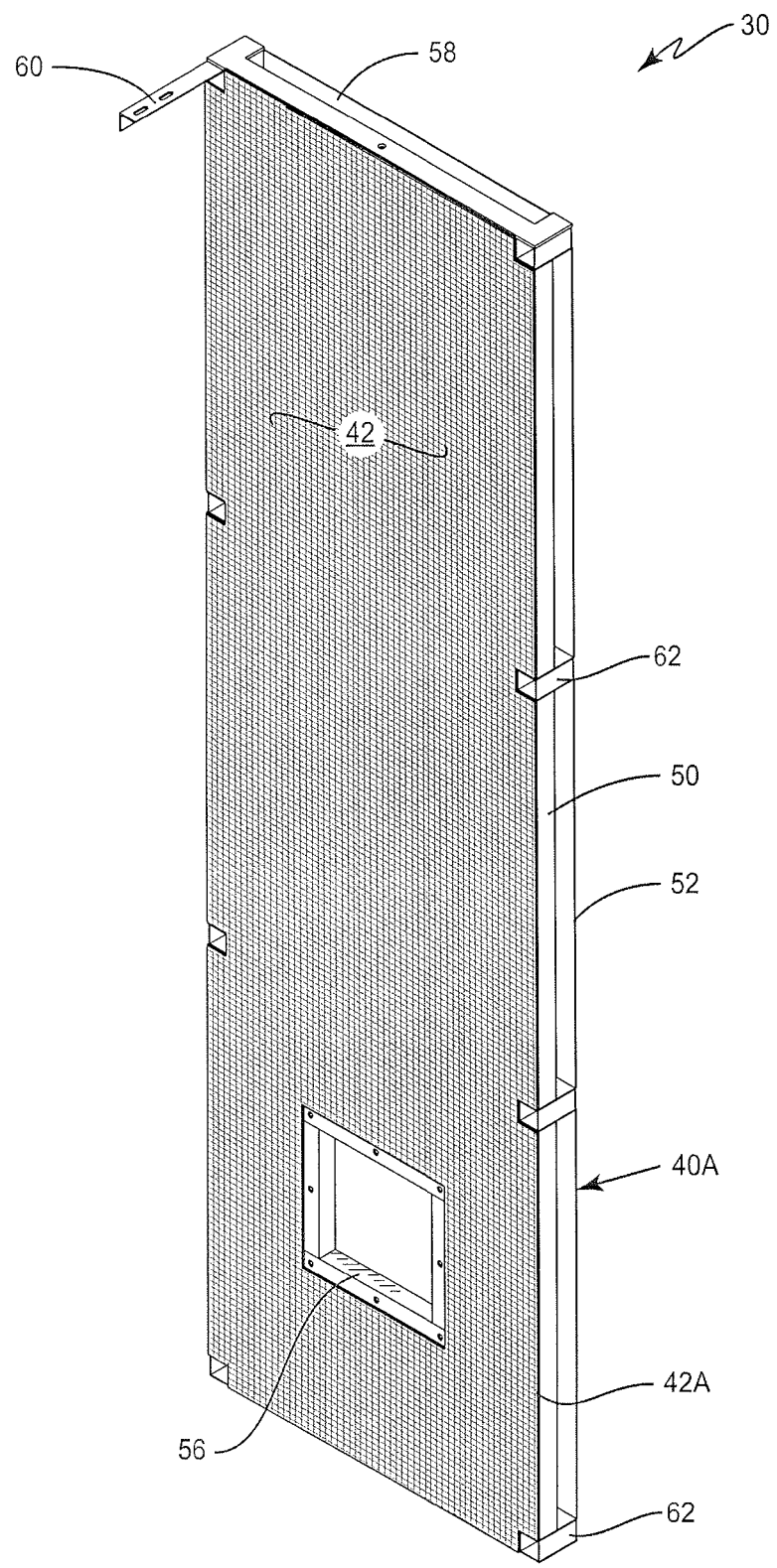
FIG. 2 is a perspective view of a lower screen module shown in FIG. 1.
Figure 3:
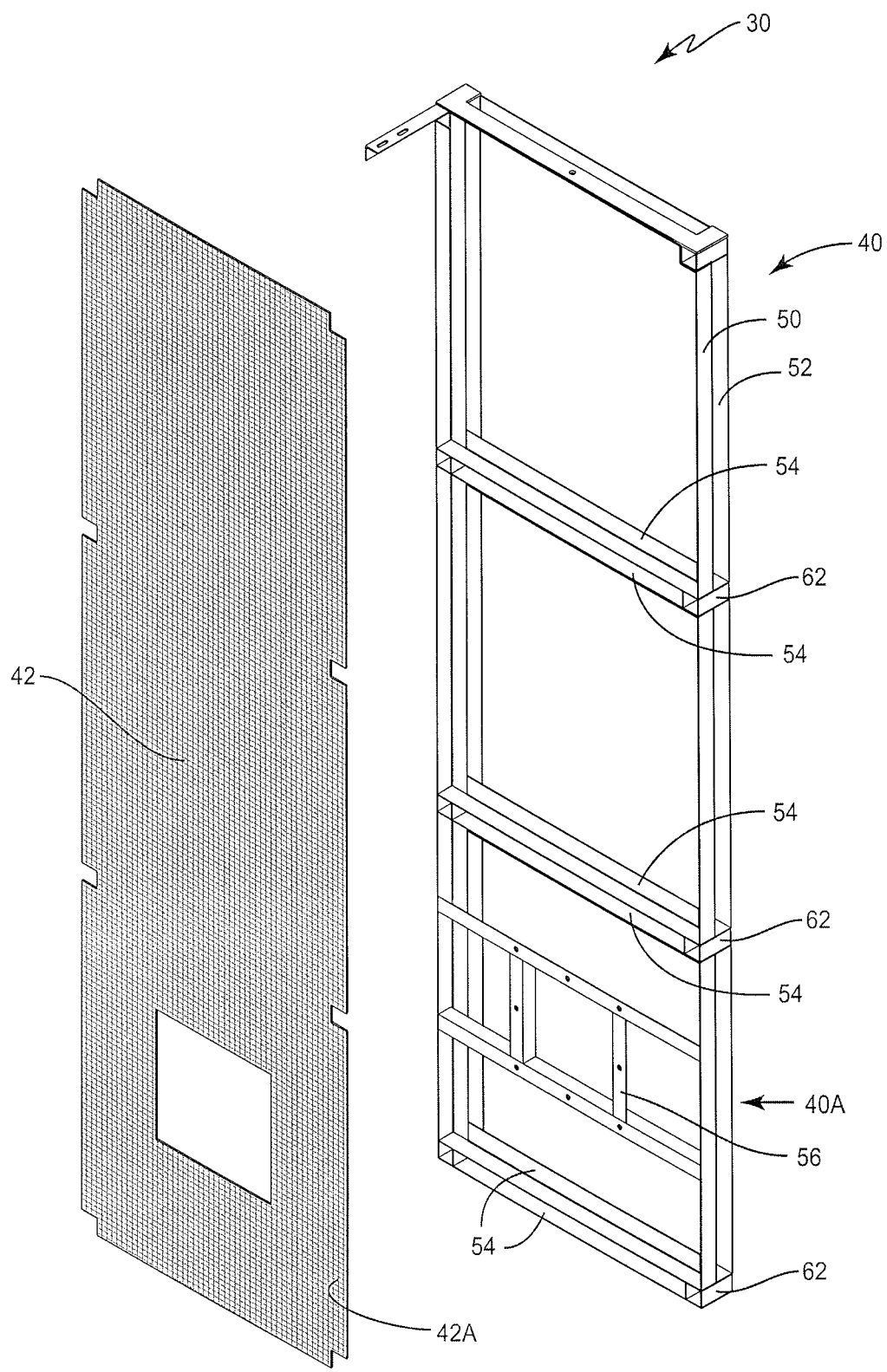
FIG. 3 is a perspective view similar to FIG. 2 but wherein the screen module is shown in an exploded view.
Figure 5:
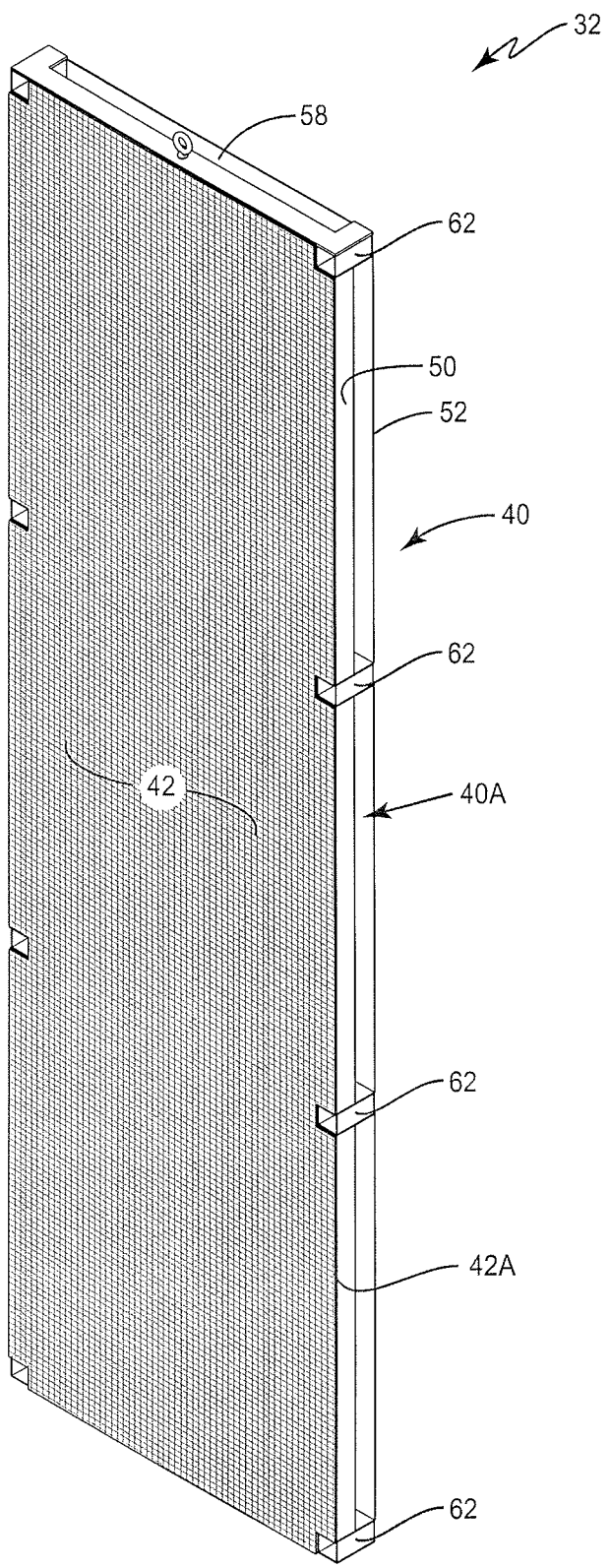
FIG. 5 is a perspective view of an upper screen module shown in FIG. 1.
Figure 6:
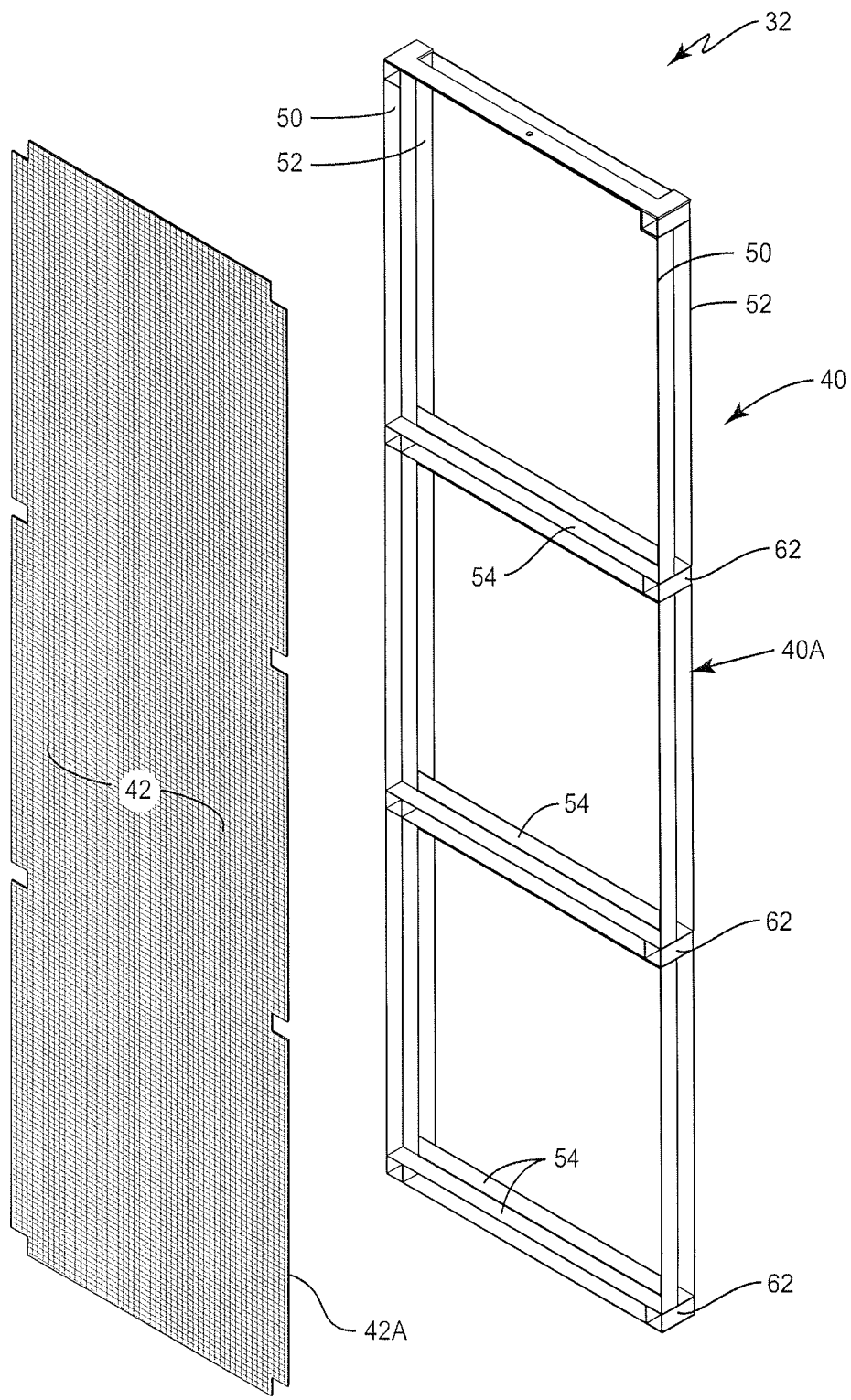
FIG. 6 is a view similar to FIG. 5 but wherein the screen module is shown in an exploded view.

Vertical screen 20 is made up of a series of screen modules. Shown in FIGS. 2 and 3 is a lower screen module indicated generally by the numeral 30. In FIGS. 5 and 6 there is shown an upper screen module indicated generally by the numeral 32. In the embodiment illustrated herein, the vertical screen 20 comprises four lower screen modules 30 disposed in side-by-side relationship and four upper screen modules 32 also disposed in side-by-side relationship but overlying the four lower screen modules 30. As seen in FIG. 1, the respective screen modules are spaced close together so as to increase the screening area that is provided by the respective modules. The design of the screening structure of the present invention aims at generally limiting the non-screening structure adjacent the wall 16. In other words, it is desirable that the frame supporting the individual screen panels not extend substantially outwardly past the individual screen panels.

Figure 7A:
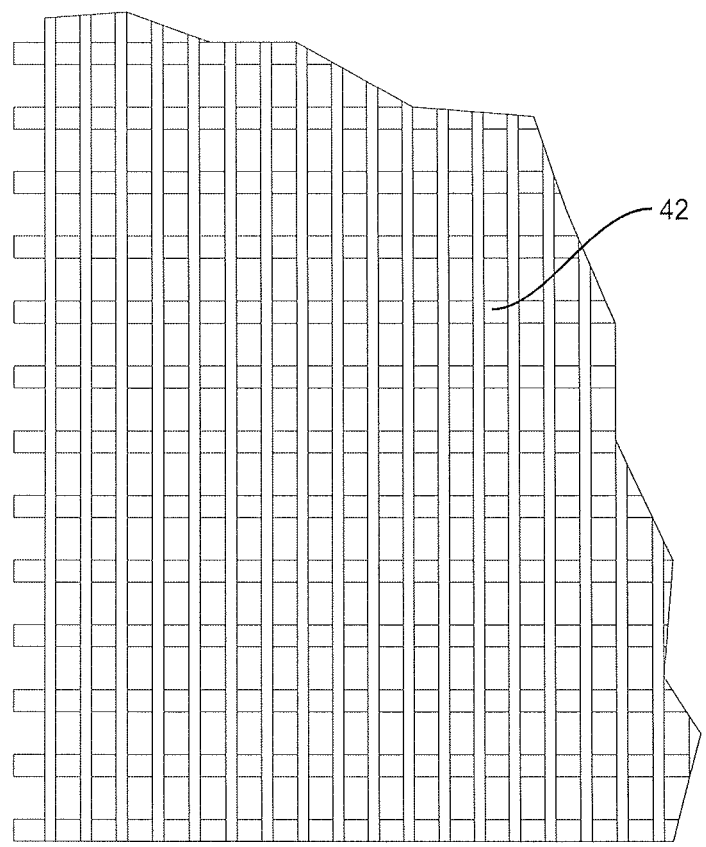
FIG. 7A is a fragmentary plan view showing a portion of a screen panel that forms a part of each screen module.
Figure 7B:
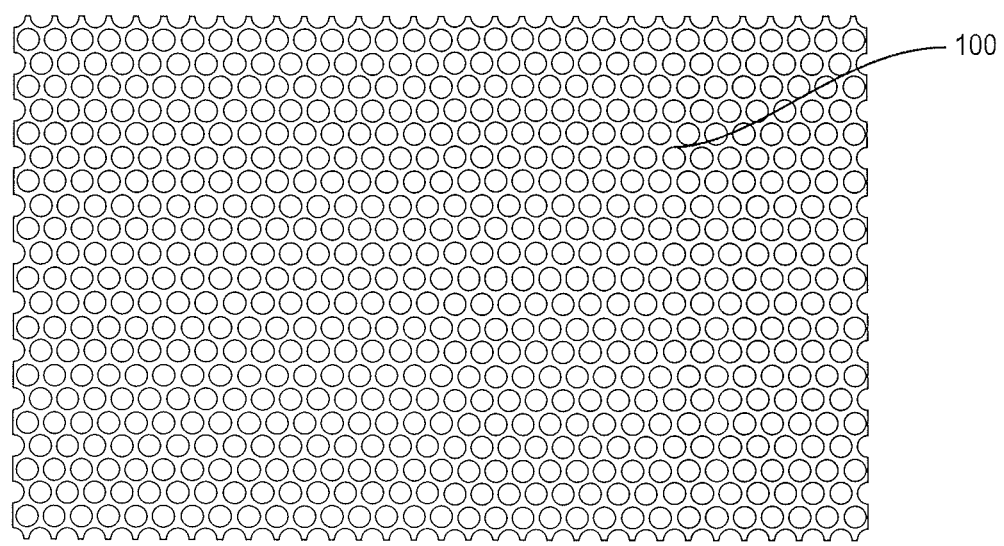
FIG. 7B shows a portion of a flashing strip used in the screen structure shown in FIG. 1.
Figure 8:
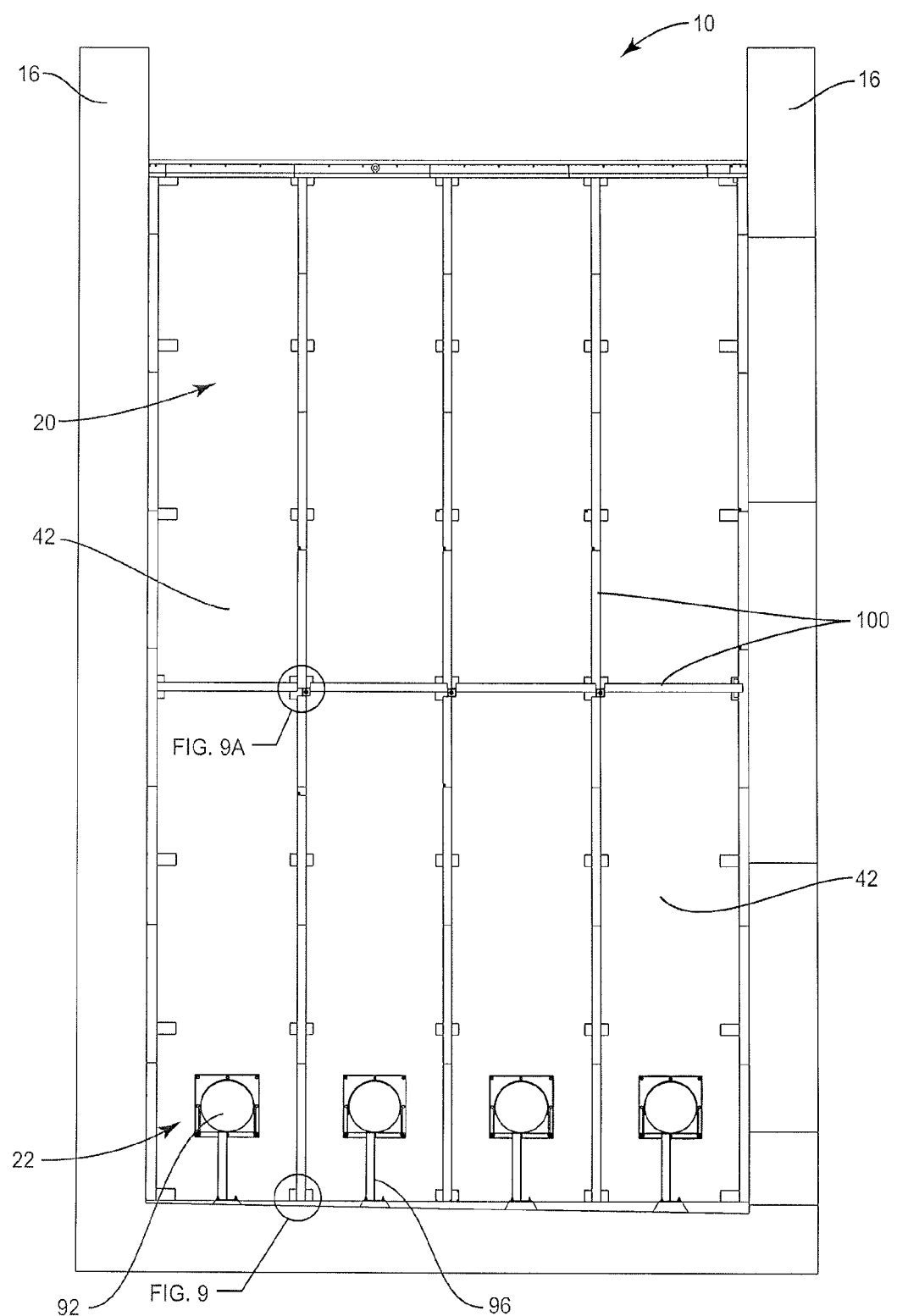
FIG. 8 is an elevation view of the screen structure mounted to a wall of a tank or reactor.

With reference to FIGS. 2 and 3, the lower screen module 30 is shown therein. Each screen module 30 includes a frame indicated generally by the numeral 40. The frame 40 can be made of various materials but in the embodiment illustrated herein the frame is constructed of lightweight sheet metal. Secured to the frame 40 by weldment or other suitable means is a screen panel 42. See FIG. 7A for details of the screen panel as in this embodiment the screen panel comprises a wedge wire construction. Screen panel 42 is thusly integral with the frame 40 and it should be noted that when installed the frame and screen panel are installed as a unit. Thus the screen panel 42 is integral with the frame 40.

Frame 40 includes an outer edge referred to generally by the numeral 40A. Screen panel 42 also includes an outer edge 42A. When the screen panel 42 is integrally formed with the frame 40, the outer edge of the screen 42A is generally flush with the outer edge 40A of the frame. This means that the frame 40 does not project substantially past the outer edge 42A of the screen panel. The desire is to minimize or reduce the amount of frame 40 that extends past the outer edge of screen 42A.

Viewing the outer edge 40A of the frame 40, the same includes an angled member 50. Note in FIG. 3 where one side of the angled member 50 forms a part of the outer edge 40A of the frame 40. Another part of the angled member 50 projects inwardly from the outer edge 40A. Frame 40 further includes a pair of flat members 52 that extend generally vertically about the back of the frame. Further the frame 40 includes a plurality of cross members 54 that extend transversely across the frame. Note that the cross members 54 extend in pairs at certain heights within the frame 40.

In the lower screen module 30, there is provided a support structure 56 that supports a portion of one auxiliary screen 22. See FIG. 3. Further about the top of the frame 40, there is provided an upper opening 58 (FIG. 2). Also there is provided a pipe mount 60, see FIG. 2, which projects inwardly to support a pipe associated with an air sparging system.

Integrated into the frame 40 about its perimeter is a series of anchor (support) compartments or receptors 62. See FIG. 10. These anchor receptors 62 function to receive and hold anchors or supports that are anchored in the wall 16 adjacent the screen structure. Note that the frame 40 in this embodiment includes eight anchor receptors 62 around the perimeter of the frame, four at the respective corners and four disposed intermediately between the top and bottom of the frame.

Figure 10:
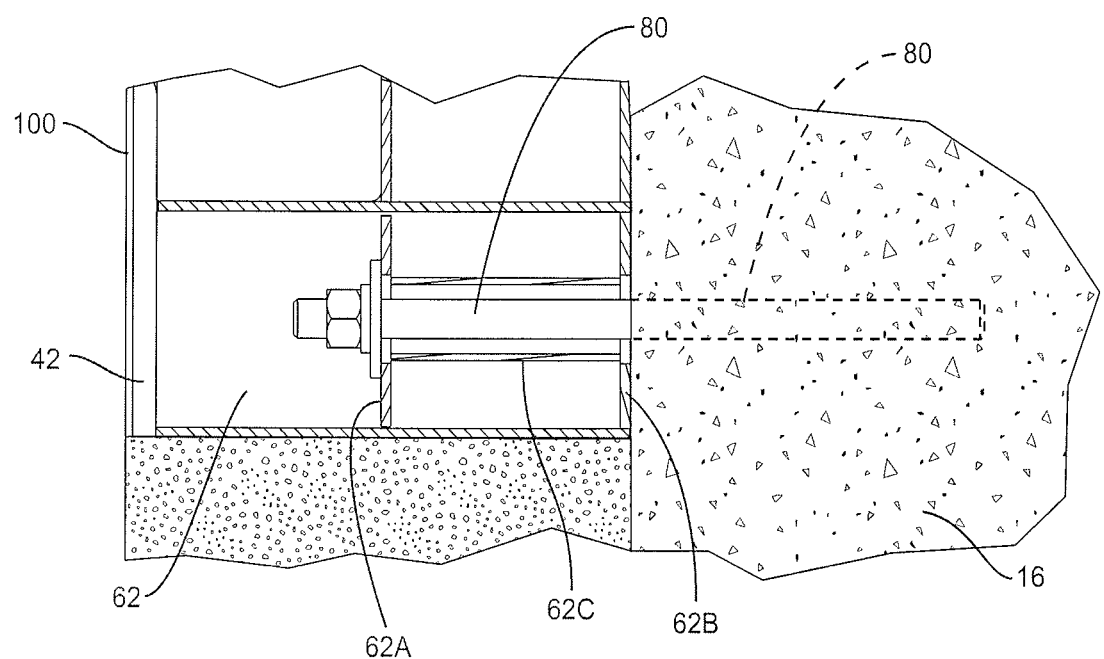
FIG. 10 is a sectional view taken along the line 10-10 of FIG. 9.

As seen in FIG. 10, each anchor receptor 62 includes a mid wall 62A and a back wall 62B. A sleeve 62C extends between the mid wall 62A and the back wall 62B. Each anchor receptor 62 is open at the front such that easy access can be gained to an anchor or support projecting into the receptor 62.

Turning briefly to the upper screen module 32, shown in FIGS. 5 and 6, this screen module is substantially similar to the lower screen module 30 just described. The basic difference is that the upper screen module 32 does not include the support structure 56 for supporting an auxiliary screen 22. Hence there is no screen cutout formed in the screen panel 42 of the upper screen module 32. Screen modules 30 and 32 are mounted to wall 16 by an array of anchors or supports 80 that project outwardly from the wall 16. See FIGS. 10 and 11. There are various ways to mount the screen modules 30 and 32 to the wall 16. One way is to preset the anchors 80 in the wall 16 while the wall is being formed. That is in one embodiment the wall 16 is a concrete wall and the anchors 80 are strategically placed and set in the wall while the wall is being formed. Another embodiment, and the embodiment disclosed herein, entails utilizing the frames 40 of the screen modules 30 and 32 to actually drill holes in the concrete wall 16 after which the anchors or supports 80 are inserted into the drilled bores and secured therein by various means such as adhesives. More particular, each respective screen module 30 and 32 is placed against the wall 16 and held in place while a drill bit is inserted through sleeve 62C, as shown in FIG. 10, to drill an opening in the adjacent wall 16. Once an opening has been formed, the drill bit is removed and a threaded anchor bolt is inserted through the front open area of the receptor 62 into and through the sleeve 62C and on into the bore formed in the wall 16. Then a nut and a washer are secured to the outer terminal end of the anchor 80. This same process is performed around the perimeter of the frame 40. In the embodiment shown herein, each frame for each module 30 and 32 includes eight receptors 62 and hence each screen module 30 and 32 is secured to the wall 16 by eight anchors or supports projecting from the wall 16. After the screen modules 30 and 32 are secured adjacent the wall 16, it follows that mounting hardware is easily accessible for verification or removal because each receptor 62 is open at the front and this allows easy access to the nut and anchor 80 at each location around the perimeter of the frame 40.

Figure 4:
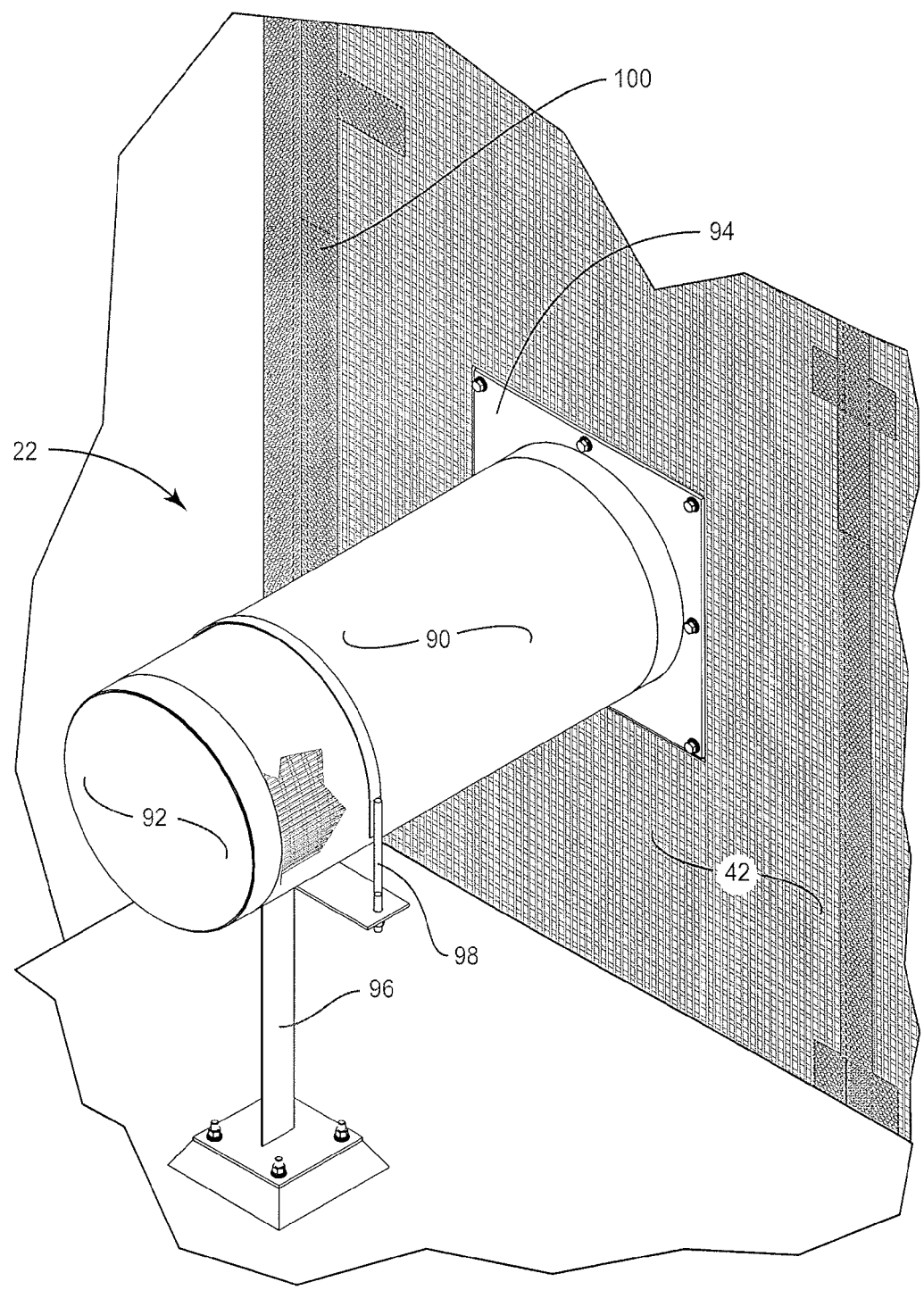
FIG. 4 is a fragmentary perspective view showing an auxiliary screen.

Returning to the auxiliary screens 22, as shown in FIG. 4, each auxiliary screen includes a screen area 90. Although the shape of the auxiliary screens 22 can vary, in the embodiment illustrated herein each auxiliary screen assumes a cylindrical shape. Interiorly of the screen area 90 is an open area for receiving water that passes through the screen area 90. An end cap 92 is secured to the terminal end of each auxiliary screen 22. A connecting plate 94 disposed opposite the end cap 92 functions to secure the auxiliary screen to the support structure 56 that forms a part of the frame 40 of the lower screen modules 30. A vertical support 96 extends upwardly and connects to a horizontal bar that receives a U-ring connector 98 that extends around the cylindrical portion of the auxiliary screen 22.

It follows that the auxiliary screens 22 add additional screening area. Treated water passes through the screen area 90 into the interior area of each auxiliary screen 22. From the interior area, the water travels generally horizontally through the plane of the screen panels 42 that form a part of the lower screen modules 30.

Figure 9:
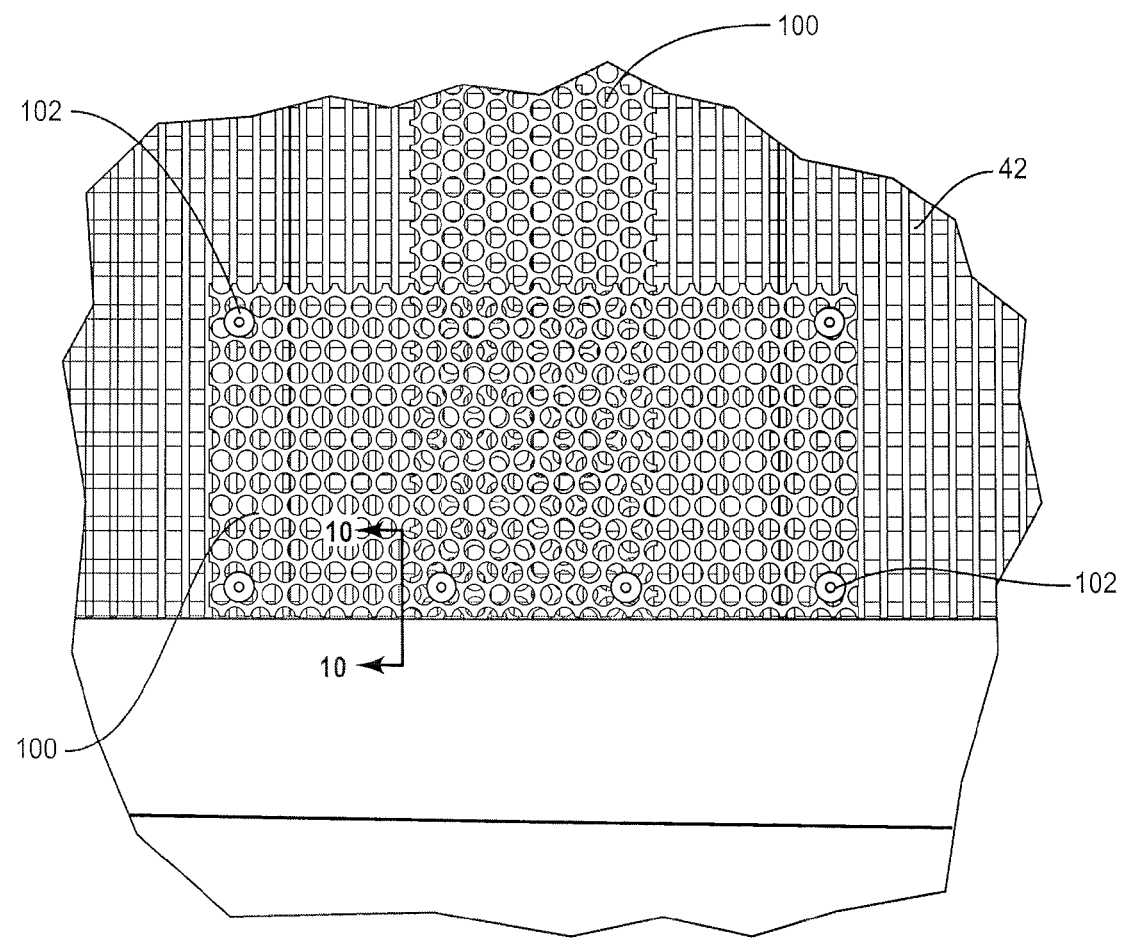
FIG. 9 is a fragmentary elevation view showing the use of flashing strips used to flash portions of the screen structure.
Figure 9A:
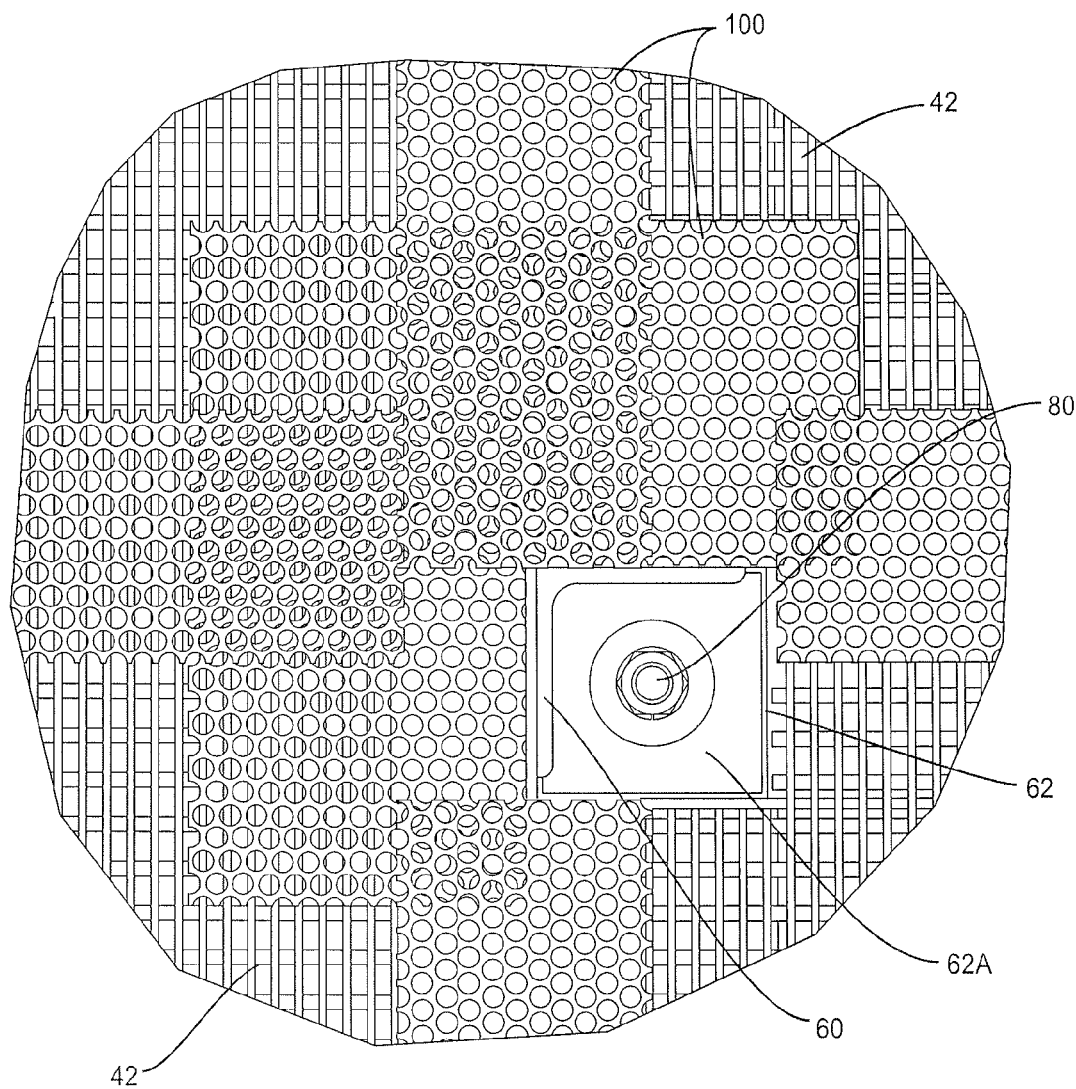

As discussed above, it is desirable to space the respective screen modules 30 and 32 as close together as practical. In this regard it is desirable to reduce or minimize the gaps that may occur between adjacent screen modules 30 and 32. However as a practical matter there will be small gaps between the respective screen modules 30 and 32. The present invention entails utilizing a flashing 100 to cover these gaps between respective screen modules 30 and 32 and in some cases to cover the front open areas defined by the receptors 62. Flashing 100 is secured to the screens 42 of the screen modules 30 and 32 by a series of rivets 102. See FIGS. 9 and 9A. Note, as shown in FIG. 1, where there is a series of vertical flashing strips 100 that extend vertically between adjacent modules 30 and 32. In addition there is provided flashing strips 100 across the top edge of each module 30 and 32. This covers the openings 58 formed in the upper edge of the modules. As noted above, and as shown in FIG. 9, the flashing strips 100 can also extend transversely across and cover two or more open areas formed by the receptors 62.

Screens 42 that form a part of the screen modules 30 and 32 along with the flashing strips 100 provides a relatively smooth vertical screen surface about the entire wall 16. This relatively smooth screen surface does not impede or retard the biofilm carriers 12 that might come in contact with the screen surface. Furthermore the use of the flashing strips 100 enable the provision of screening that covers substantially the entire surface area of the wall 16 and in the process cover gaps that may be created between respective screen modules 30 and 32.

It follows that during a wastewater treatment process, that the vertical screen 20 made up of the screen modules 30 and 32 along with the auxiliary screens 22 enable treated wastewater to pass through the screen structure and into the drain or outlet 18 shown in FIG. 12. At the same time, the vertical screen 20 and the auxiliary screens 22 retain the biofilm carriers 12 and prevent the biofilm carriers from being discharged through the outlet 18.

There are many advantages to the screen modules discussed above. They retain the biofilm carriers 12 and the frames forming a part of the modules consume a minimum of space and therefore do not significantly detract from the screening area. Thus the effective screening area is increased or generally maximized. Furthermore the frames 40 do not interfere with the biofilm carriers 12, and particularly do not impede the movement of the biofilm carriers or cause blockages to occur adjacent the screen structure. Furthermore the screen modules are easy to align and install and by their nature decrease fabrication and installation costs. Because of the construction of the frames of the screen modules, the frames are slightly flexible and this permits them to conform to irregularities in the adjacent wall.

The present invention provides a screening system where the effective area of the screen is substantial with respect to the wall surface of the reactor that is effectively covered by the screen. Effective screen area is the area of the screen that permits water to flow there through divided by the area of a wall that is effectively covered by the screen. For example, assume that there is a vertical screen assembly disposed adjacent a wall. Assume that the area of the wall effectively covered by the screen assembly is 100 square feet. Assume that the screen has an area of 97 square feet; that is, assume that water can flow through 97 square feet of screen. Therefore, 97 divided by 100 yields an effective screen area of 97%. In cases where there are no auxiliary screens added, the present invention can achieve an effective screen area of 97%-99%. If auxiliary screens or cylindrical screens are added the effective screen area will typically range from 99% to 140%. In the embodiment illustrated in FIG. 11, the screening is only applied to one wall of the reactor. It should be appreciated that screening can be applied to other walls or areas of the reactor. For example, there may be a main screen assembly that covers a substantial portion of one wall and one or more other screen assemblies disposed adjacent portions of other walls.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A biological wastewater treatment system comprising:
at least one tank for biologically treating the wastewater;
biofilm carriers disposed in the tank;
a screen structure mounted to the tank for screening treated wastewater flowing from the tank and preventing the biofilm carriers from leaving the tank;
the screen structure including a vertical screen disposed adjacent a wall of the tank;
the screen structure further including one or more auxiliary screens projecting from the vertical screen inwardly towards an interior area of the tank; and
each auxiliary screen including a screen area that extends around an open area and where each auxiliary screen is configured relative to the vertical screen such that treated wastewater passes through the screen area of each auxiliary screen into the open area of each auxiliary screen and thereafter passes through the plane of the vertical screen.

2. The system of claim 1 wherein the vertical screen includes at least one through opening and wherein the auxiliary screen is communicatively connected to the through opening and projects generally horizontally outwardly therefrom.

3. The system of claim 1 wherein the vertical screen includes a plurality of through openings and wherein there is provided a plurality of auxiliary screens with each auxiliary screen communicatively connected to one of the through openings; and wherein the screen area of each auxiliary screen extends generally perpendicular with respect to the vertical screen.

4. The system of claim 3 where each auxiliary screen assumes a generally cylindrical shape and wherein the screen area of each auxiliary screen forms a perforated generally cylindrical wall.

5. The system of claim 1 where the screen structure comprises a plurality of screen modules with each module including a frame and a screen panel supported by the frame and wherein the screen panels of the screen modules are disposed adjacent to each other and form the vertical screen.

6. The system of claim 1 wherein the screen structure includes a plurality of screen modules with each module including a frame and a screen panel supported by the frame; and wherein each frame is designed to provide a narrow frame around the screen panel such that when the screen modules are disposed in side-by-side relationship the frame exposed between the respective screen panels is narrow.

7. The system of claim 1 wherein the screen structure is mounted adjacent the wall that forms a part of the tank; the screen structure including a plurality of screen modules disposed in side-by-side relationship adjacent the wall; a plurality of screen module supports projecting outwardly from the wall and into engagement with the screen modules for supporting the screen modules adjacent the wall.

8. The biological wastewater treatment of claim 1 wherein the screen structure includes an effective screening area of approximately 99% to 140% of the area of the vertical screen.

9. A biological wastewater treatment system that utilizes biofilm carriers that move about in a process to biologically treat wastewater, the system comprising:
a tank for receiving and holding wastewater to be treated and wherein the tank is adapted to receive and hold the biofilm carriers;
a plurality of screen modules mounted in the tank for confining the biofilm carriers in the tank;
each screen module including:
a frame having a front, back and an outer edge;
a screen secured to the frame and including an outer edge;
wherein the frame and screen are configured such that when the screen is attached to the frame a substantial portion of the surrounding side edge of the frame aligns with the outer edge of the screen;
wherein the system includes two or more screen modules mounted in side-by-side relationship or one over the other in the tank and wherein the outer edges of adjacent screens terminate in close proximity to each other so as to generally minimize the presence of portions of the frame between the outer edges of adjacent screens; and
wherein the outer edge of the frame of each screen module is formed in part at least by a side of an angled piece of material and wherein the side of the angled piece of material of each frame is generally flush with the outer edge of the screen secured to that frame.

10. The system of claim 9 wherein the frame of each screen module is provided with a plurality of tubes for receiving supports, wherein the supports project from the tank through the tubes so as to support the respective screen modules in a vertical orientation in the tank.

11. The system of claim 9 wherein the plurality of screen modules forms a vertical screen in the tank wherein the vertical screen is made up of a plurality of screens attached to the frames of a plurality of screen modules; and wherein there is further provided a plurality of auxiliary screens that project horizontally from the vertical screen; each auxiliary screen including a screen area and an open interior area; and wherein treated wastewater enters the screen area and moves to the interior area and thereafter passes through the plane of the vertical screen.

12. A biological wastewater treatment system for treating wastewater which utilizes biofilm carriers in the wastewater, the system comprising:
a tank for receiving the wastewater to be treated and for containing the biofilm carriers;
the tank including a wall structure having an inner side;
a series of screen modules mounted adjacent the inner side of the wall structure for preventing the biofilm carriers from leaving the tank as the wastewater is removed from the tank;
each screen module including:
a frame having a front, back and an outer edge;
a screen secured to the frame and including an outer terminal edge;

the outer terminal edge of the screen terminating adjacent the outer side edge of the frame;

wherein when mounted to the wall of the tank, the screen modules are disposed adjacent each other with the screen modules being disposed in side by side relationship, one over the other, or both in a side by side relationship and one over the other;

wherein when mounted adjacent the wall of the tank, the screens of the screen modules form a vertical screen adjacent the inner side of the wall and wherein portions of the outer edges of the respective screens abut or terminate in close relationship to the outer edges of adjacent screens; and one or more auxiliary screens projecting inwardly from the vertical screen and wherein wastewater enters the auxiliary screen and from the auxiliary screen moves through the plane of the vertical screen.

13. The system of claim 12 wherein the frame of each screen module includes integral receptacles for receiving supports that project from the wall of the tank for supporting the screen modules, each receptacle configured to receive a support such that the screen module is supported on the supports.

14. The system of claim 12 wherein the outer edge of the frame of each screen module includes a perimeter frame; and wherein there is provided a series of cross members extending between the perimeter frame; and wherein there is provided stud openings integral with the frame for receiving studs or supports that project from the wall of the tank such that the frame is supported by the studs or supports that project through the stud openings.

15. The system of claim 12 wherein there is provided a plurality of through openings in the vertical screen and wherein there is provided an auxiliary screen communicatively connected to each through opening and projecting inwardly therefrom, each auxiliary screen including a surrounding screen area that extends around an open area such that wastewater can move through the surrounding screen area of each auxiliary screen, into the open area and thereafter pass through the plane of the vertical screen.

16. The system of claim 15 wherein each auxiliary screen assumes a generally cylindrical shape and wherein the surrounding screen area forms a perforated cylindrical wall.

17. The system of claim 16 wherein the auxiliary screens are elongated and wherein there is provided a support for engaging and supporting an end portion of each auxiliary screen at a location that is spaced inwardly from the vertical screen formed by the plurality of screen modules.

18. The system of claim 12 wherein the frame of each screen module includes an outer edge and wherein the screen panel of each screen module includes an outer edge and wherein the outer edge of the screen panel and the outer edge of the frame are generally aligned such that the frame does not project substantially outwardly past the outer edge of the screen panel.

19. A wastewater treatment system for treating wastewater by utilizing biofilm carriers, the system comprising:
a tank for holding wastewater;
the tank including at least one side wall;
an outlet formed in the tank for discharging wastewater therefrom;
a series of screen modules mounted to the side wall upstream of the outlet for preventing biofilm carriers from being discharged through the outlet;
the series of screen modules being mounted adjacent to each other to form a screen structure that covers a substantial portion of the side wall; and
each screen module including as a unit:
(a) a frame including a perimeter frame and one or more cross members extending about the frame; and
(b) a screen panel secured to the frame; and
a series of anchors projecting from the wall into the respective screen modules for supporting the screen modules on the wall.

20. The system of claim 19 wherein the frame of each screen module includes a plurality of anchor compartments with each anchor compartment including a sleeve for receiving an anchor that projects from the side wall.

21. The system of claim 20 wherein each anchor compartment is open about a front thereof in order that access may be gained to the anchor projecting into the anchor compartment.

22. A biological wastewater treatment system for treating water which utilizes biofilm carriers in the wastewater, the system comprising:
a tank for receiving the wastewater to be treated and for containing the biofilm carriers;
the tank including a wall structure having an inner side;
a series of screen modules mounted adjacent the inner side of the wall structure for preventing the biofilm carriers from leaving the tank as the wastewater is removed from the bank;
each screen module including:
a frame;
a screen secured to the frame;
the series of screen modules mounted adjacent each other in side by side relationship or one over the other;
at least one flashing screen overlying at least two screen modules and extending over terminal edges of the at least two screen modules; and
wherein, the flashing screen includes an array of openings that permits the wastewater to flow there through.

23. The biological wastewater treatment system of claim 22 wherein the series of screen modules are disposed in side-by-side relationship and wherein there is provided a series of screen flashings with respective screen flashings extending vertically and overlying at least two adjacently disposed screen modules.

24. The biological wastewater treatment system of claim 23 wherein some screen flashings extend vertically and overlap two or more screen modules, and wherein, some screen flashings extend horizontally and overlap two or more screen modules.

25. A biological wastewater treatment system that utilizes biofilm carriers that move about in a process to biologically treat wastewater, the system comprising:
a tank for receiving and holding wastewater to be treated and wherein the tank is adapted to receive and hold the biofilm carriers;
a plurality of screen modules mounted in the tank for confining the biofilm carriers in the tank;
each screen module including:
a frame having a front, back and an outer edge;
a screen secured to the frame and including an outer edge;
wherein the frame and screen are configured such that when the screen is attached to the frame a substantial portion of the surrounding side edge of the frame aligns with the outer edge of the screen;
wherein the system includes two or more screen modules mounted in side-by-side relationship or one over the other in the tank and wherein the outer edges of adjacent screens terminate in close proximity to each other so as to generally minimize the presence of portions of the frame between the outer edges of adjacent screens; and wherein the frame of each screen module is provided with a plurality of tubes for receiving supports, wherein the supports project from the tank through the tubes so as to support the respective screen modules in a vertical orientation in the tank.

26. A biological wastewater treatment system for treating wastewater which utilizes biofilm carriers in the wastewater, the system comprising:
 a tank for receiving the wastewater to be treated and for containing the biofilm carriers;
 the tank including a wall structure having an inner side;
 a series of screen modules mounted adjacent the inner side of the wall structure for preventing the biofilm carriers from leaving the tank as the wastewater is removed from the tank;
 each screen module including:
  a frame having a front, back and an outer edge;
  a screen secured to the frame and including an outer terminal edge;
 the outer terminal edge of the screen terminating adjacent the outer side edge of the frame;
 wherein when mounted to the wall of the tank, the screen modules are disposed adjacent each other with the screen modules being disposed in side by side relationship, one over the other, or both in a side by side relationship and one over the other;
 wherein when mounted adjacent the wall of the tank, the screens of the screen modules form a vertical screen adjacent the inner side of the wall and wherein portions of the outer edges of the respective screens abut or terminate in close relationship to the outer edges of adjacent screens; and
 wherein the frame of each screen module includes integral receptacles for receiving supports that project from the wall of the tank for supporting the screen modules, each receptacle configured to receive a support such that the screen module is supported on the supports.

27. A biological wastewater treatment system for treating wastewater which utilizes biofilm carriers in the wastewater, the system comprising:
 a tank for receiving the wastewater to be treated and for containing the biofilm carriers;
 the tank including a wall structure having an inner side;
 a series of screen modules mounted adjacent the inner side of the wall structure for preventing the biofilm carriers from leaving the tank as the wastewater is removed from the tank;
 each screen module including:
  a frame having a front, back and an outer edge;
  a screen secured to the frame and including an outer terminal edge;
 the outer terminal edge of the screen terminating adjacent the outer side edge of the frame;
 wherein when mounted to the wall of the tank, the screen modules are disposed adjacent each other with the screen modules being disposed in side by side relationship, one over the other, or both in a side by side relationship and one over the other;
 wherein when mounted adjacent the wall of the tank, the screens of the screen modules form a vertical screen adjacent the inner side of the wall and wherein portions of the outer edges of the respective screens abut or terminate in close relationship to the outer edges of adjacent screens; and
 wherein the outer edge of the frame of each screen module includes a perimeter frame; and wherein there is provided a series of cross members extending between the perimeter frame; and wherein there is provided stud openings integral with the frame for receiving studs or supports that project from the wall of the tank such that the frame is supported by the studs or supports that project through the stud openings.

28. A biological wastewater treatment system for treating wastewater which utilizes biofilm carriers in the wastewater, the system comprising:
 a tank for receiving the wastewater to be treated and for containing the biofilm carriers;
 the tank including a wall structure having an inner side;
 a series of screen modules mounted adjacent the inner side of the wall structure for preventing the biofilm carriers from leaving the tank as the wastewater is removed from the tank;
 each screen module including:
  a frame having a front, back and an outer edge;
  a screen secured to the frame and including an outer terminal edge;
 the outer terminal edge of the screen terminating adjacent the outer side edge of the frame;
 wherein when mounted to the wall of the tank, the screen modules are disposed adjacent each other with the screen modules being disposed in side by side relationship, one over the other, or both in a side by side relationship and one over the other;
 wherein when mounted adjacent the wall of the tank, the screens of the screen modules form a vertical screen adjacent the inner side of the wall and wherein portions of the outer edges of the respective screens abut or terminate in close relationship to the outer edges of adjacent screens; and
 wherein there is provided a plurality of through openings in the vertical screen and wherein there is provided an auxiliary screen communicatively connected to each through opening and projecting inwardly therefrom, each auxiliary screen including a surrounding screen area that extends around an open area such that wastewater can move through the surrounding screen area of each auxiliary screen, into the open area and thereafter pass through the plane of the vertical screen.

* * * * *